June 14, 1966   B. C. BELLAIRE ETAL   3,255,473

RETHREADING TOOL

Filed Jan. 6, 1964

INVENTORS.
BYRON C. BELLAIRE
LEO WOZNY
BY
Malcolm W. Fraser
ATTORNEY

United States Patent Office 3,255,473
Patented June 14, 1966

3,255,473
RETHREADING TOOL
Byron C. Bellaire and Leo Wozny, both of Toledo, Ohio; said Wozny assignor to Joseph J. Csiszar, South Bend, Ind.
Filed Jan. 6, 1964, Ser. No. 335,859
1 Claim. (Cl. 10—1)

This invention relates to rethreading tools but more particularly to a simple portable rethreader which is especially useful in rethreading, resizing and gauging cross-threaded, stripped or swollen valve bodies of plastic or similar material, such as extensively used on dispensing apparatus for beverages.

Heretofore valve bodies used in dispensing apparatus are of a relatively hard plastic material and the externally threaded inlet or outlet projections not infrequently become stripped or cross-threaded due to swelling of the plastic, careless operation or other causes which has resulted in discarding of these bodies. This has not only been costly but also troublesome because the dispenser has been rendered unusable until a suitable replacement is installed.

An object of this invention is to overcome the above difficulty and to produce a simple tool which is manually operated to rethread the valve body so that in a short time it can again be used with adequate threads in accurate alignment with the respective fluid passage.

Another object is to produce a new and improved rethreading tool having the unique features of construction and operation hereinafter described.

Other objects and advantages of the invention will hereinafter appear and, for purposes of illustration but not of limitation, an embodiment of the invention is shown on the accompanying drawings, in which FIGURE 1 is a plan view of the rethreader tool applied to a valve body in the position for rethreading the same, parts of the tool and the body being broken away for purposes of clarity;

Figure 1:
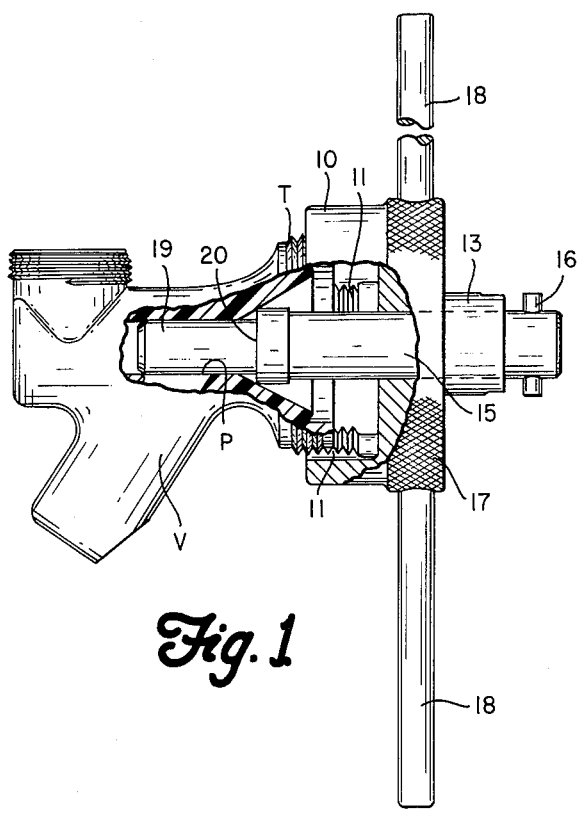
Figure 2:
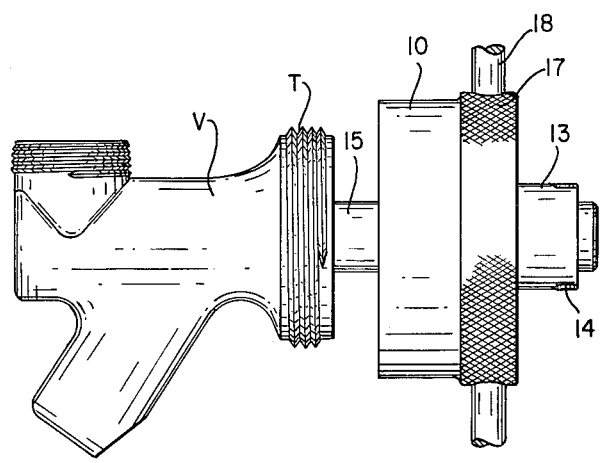
FIGURE 2 is a plan view of the valve body and rethreading tool assembly and showing the rethreading tool being removed or separated from the valve body or alternatively showing the position of the parts initially and before rethreading has commenced.

The illustrated embodiment of the invention comprises a rethreading tool having a cup-shaped metallic thread former body 10, on the inside of which are four equidistantly spaced thread cutting sectors 11 which project inwardly from the cylindrical wall of the tool. 12 represents the outer closed end of the tool body, the opposite or inner end being open. Formed integrally with the outer end 12 and arranged coaxially thereof is an outwardly extending tubular boss 13, on the outer end of which is a pair of diametrically aligned notches 14 for a purpose hereinafter to be described.

Slideable in and guided by the boss 13 is an elongate guide shaft 15, the outer end portion of which has a smooth sliding fit within the bore of the boss 13. Projecting through the outer end portion of the shaft 15 is a transverse pin 16, portions of which project outwardly from opposite sides of the shaft, as indicated on FIGURE 1. The pin 16 is of such size as to fit nicely within the notches 14, and, when the body 10 is pulled outwardly along the shaft 15 to its outer extremity, the pin 16 can seat in the notches 14, so that turning of the body 10 imparts corresponding turning movement to the guide shaft 15 and facilitates its removal from the valve body as will hereinafter appear.

Figure 3:
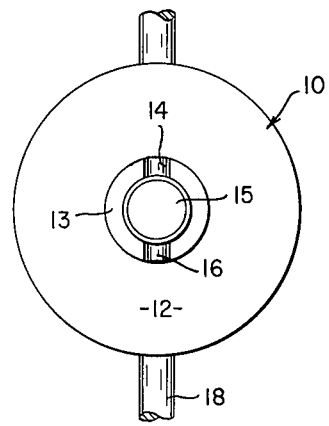
FIGURE 3 is an outer end elevation of the rethreading tool.
Figure 4:
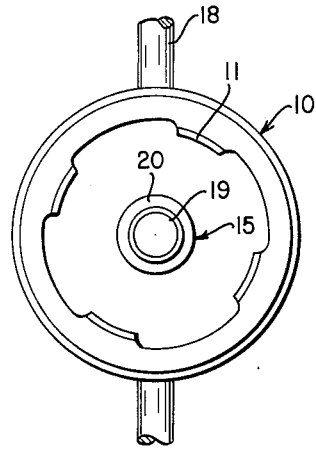
FIGURE 4 is an inner end elevation of the rethreading tool.

Projecting from a knurled annular rim 17 on the outer end portion of the former pin are a pair of outwardly extending pins 18 arranged in alignment with each other and also in positions corresponding to notches 14, as shown on FIGURE 3. The pins or rods 18 provide operating handles for the tool for enabling the former body to be rotated manually as well as to be shifted axially.

The guide shaft 15 is provided with a pilot extension 19, which is of somewhat reduced diameter, and at the juncture between the pilot extension 19 and the shaft 15 is a shoulder 20 which provides a stop for limiting the movement of the pilot into the passage in the valve body, as will hereinafter appear.

V designates a valve body which is of a suitable relatively hard plastic material, such as polyethylene. This is the type of body which is commonly used in connection with beverage dispensers, it being connected at one end to a beverage container equipped with the usual dispensing nozzle and hand pump (not shown). As shown in FIGURE 1, there is a somewhat restricted cylindrical passage P, which terminates in enlarged cylindrical projection having external screw threads T, the same being coaxial with the passage P. The threaded projection T may be that which is screw-threaded to the beverage container and due to the frequent application to and removal from the various containers, the swelling of the plastic material and abuse normally given to such a device, the threads become stripped for one reason or another and require rethreading or resizing. The above described tool provides a simple means for efficiently performing this work.

In operation the pilot extension is first introduced into the passage P and forced therein until limited by the shoulder 20. Thereafter the former body 10 can be slid along the guide shaft 15 and then by employing the handle rods 18 the former is turned in order to cause the cutters 11 to effect the rethreading job. Manifestly, since the former is maintained axially aligned with the passage P, rethreading is accurately accomplished. After the rethreading job has been performed, the former is rotated in the opposite direction until it is freed from the threads on the valve body. The former body 10 is then slid outwardly along the guide shaft 15 and the pin 16 is seated in the notches 14. Then the turning of the former 10 by the handles 18 will effect turning movement of the guide shaft 15 and its pilot 19 to free the latter from the snug or binding engagement which it has with the walls of the passage P, thereby enabling the tool to be readily separated from the valve body.

Numerous changes in details of construction, arrangement and choice of materials may be effected without departing from the spirit of the invention, especially as defined in the appended claim.

What we claim is:

A tool of the class described for rethreading, resizing and gauging the threads of a body having a cylindrical externally threaded hollow projection and an internal passage of reduced diameter axially aligned with the hollow projection, said tool comprising a cup-shaped forming body having a plurality of rethreading sectors for engaging the threads on the hollow projection, a shaft slideable axially of said forming body and having a reduced pilot extension for snugly fitting the reduced passage of the body, an outwardly extending integral boss on the center of the forming body with which the shaft has a nice sliding fit, a pair of opposed notches in the outer end of said boss, a pin extending through the outer end of the shaft the end portions of which fit said notches respectively, and oppositely extending rods in said forming body constituting the handle means thereof, said rods being correspondingly positioned relative to said notches.

References Cited by the Examiner
UNITED STATES PATENTS

| | | | |
|---|---|---|---|
| 915,325 | 3/1909 | Bartol | 10—123 |
| 2,744,269 | 5/1956 | Kerr et al. | 10—123 |

WILLIAM W. DYER, Jr., *Primary Examiner.*

F. T. YOST, *Assistant Examiner.*